Figure 1:
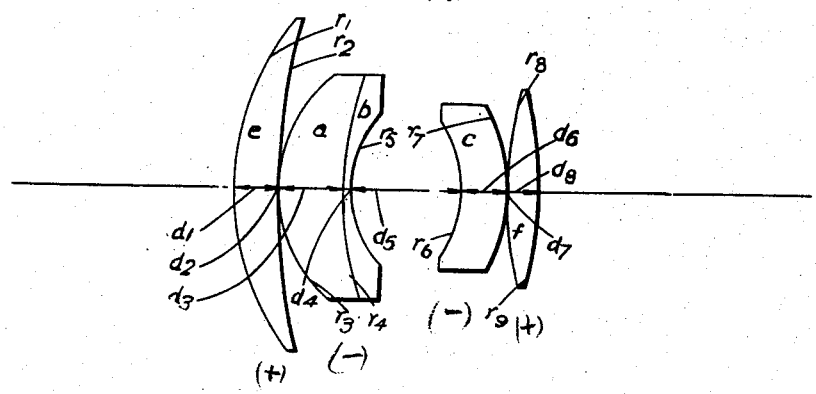

Feb. 28, 1950

C. G. WYNNE 2,499,264

LARGE APERTURE SPHERICALLY CORRECTED OBJECTIVE HAVING
TWO OUTER POSITIVE COMPONENTS AND TWO INNER NEGATIVE
MENISCUS COMPONENTS WITH ONE CEMENTED SURFACE

Filed Feb. 7, 1945

*Inventor*
Charles G. Wynne
By
Ralph B. Stewart
*Attorney*

Patented Feb. 28, 1950

2,499,264

UNITED STATES PATENT OFFICE 2,499,264

LARGE APERTURE SPHERICALLY CORRECTED OBJECTIVE HAVING TWO OUTER POSITIVE COMPONENTS AND TWO INNER NEGATIVE MENISCUS COMPONENTS WITH ONE CEMENTED SURFACE

Charles Gorrie Wynne, Bromley Hill, England, assignor to Wray (Optical Works) Limited, Bromley Hill, England, a British company Application February 7, 1945, Serial No. 576,648
In Great Britain February 25, 1944

5 Claims. (Cl. 88—57)

This invention relates to optical lenses having large relative apertures of the type consisting of two meniscus components, each having its concave surface of greater curvature than its convex surface and disposed adjacent to, one on each side of, and concave to the aperture stop and two convergent systems, one on the side of each meniscus remote from the stop. In this type of optical lens, the convergent systems may each consist of a single convergent element, or a single cemented component of two or more elements, or a number of such members. In a similar way, the menisci may each consist of two or more elements cemented together or located close together or one of the menisci may be a single element as set forth in patent application Serial No. 576,647, filed February 7, 1945.

It is a common failing in lenses of this type that when other aberrations are well corrected, there remains an aberration of the symmetrical spherical aberration type for oblique pencils, which either restricts the use of such lenses for wide angles of field, or necessitates making the oblique aperture less than the axial, with consequent reduction of light, by "vignetting" by the lens mount at the front and back. It is the purpose of this invention to reduce this higher order comatic aberration sometimes known as "oblique spherical aberration," so that such lenses may be used to cover larger angular fields than hitherto, or to give, over moderate angles, oblique apertures approximately equal to the axial.

As vignetting will increase with increased overall length of a lens, for a lens covering at all a large angular field with little or no vignetting, very great diameters for the front and back members would be necessary if the overall length were great.

One object of the present invention is an optical lens of the aforementioned type in which the oblique spherical aberration is corrected by employing an axial separation ($b$) between the concave surfaces of the two menisci which is at least 0.45 of the axial distance ($s$) from the rear surface of the front convergent system to the front surface of the rear convergent system while at least one element of the lens is made of glass. Thus, the ratio $b/s$ which is at least 0.45 is substantially greater than has been used heretofore and results in material improvement of the oblique spherical aberration while a small increase in the ratio $b/s$ commonly employed in the past for lenses of the aforementioned type produces no significant improvement.

Since at least one of the elements of the lens is made of glass and while the lens may be composed in part or entirely of normal glasses, it does admit of the use of relatively recent high refractive index glasses. At the same time, one or more of the lens elements may be formed of transparent crystal; for example, very good secondary spectrum correction may be obtained by using an alkali metal halide such as potassium bromide or iodide for the divergent element in one cemented meniscus together with suitably selected glasses for the other members. This is in contrast to the lenses set forth in British Patent Specification No. 564,133, in which two divergent elements are made of potassium iodide crystal and the four convergent elements are all made of magnesium oxide crystal in the form known as $\beta$-magnesium oxide.

A further object of the invention consists in an optical lens of the aforementioned type comprising one meniscus including a divergent element with Abbé V number less than 37.0 and a convergent element with Abbé V number greater than 54.0 or preferably greater than 55.0.

Lenses can be made in accordance with the invention in such a way that the ratio between the central axial separation of the concave surfaces of the two menisci ($b$) and the equivalent focal length ($E$) of the lenses is less than 0.27.

In place of cemented surfaces, small air spaces bounded by surfaces of the same or slightly different radii of curvature may be provided. Furthermore, some of the surfaces may be made to depart slightly from the spherical form.

Figure 2:
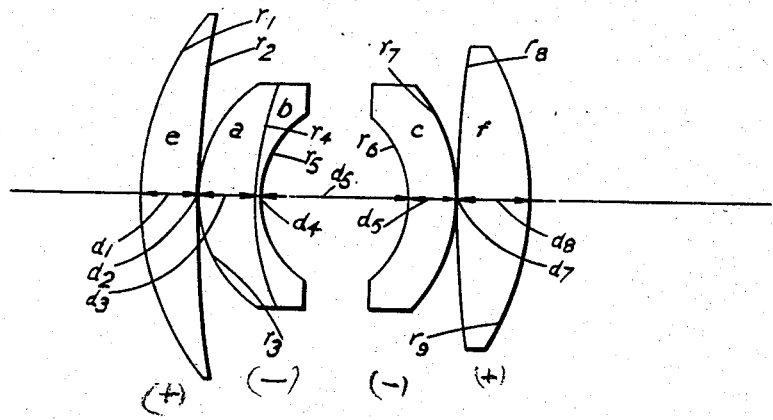

In order to explain more fully the invention, two practical examples of objectives constructed in accordance with this invention will be described with reference to the accompanying drawings in which Figures 1 and 2 show the two embodiments.

In both embodiments, the meniscus consisting of a compound component $a$, $b$ is the front meniscus in the sense that the front is that side of the lens facing the longer conjugate for which the lens is corrected, and the back meniscus is a single element $c$ placed on the opposite side of the aperture stop. In both cases, also, the front convergent lens $e$ and the back convergent lens $f$ are both single lenses.

Numerical data for these two examples are set out in Tables A and B, in which $r_1, r_2 \ldots r_9$ are the radii of curvature of the surfaces marked, a surface with convexity to the front being indicated as having a positive radius, and a surface with concavity to the front as having a negative radius of curvature; $d_1, d_2 \ldots d_8$ denote the axial thicknesses of the individual elements or the axial separations between successive surfaces; $n_1, n_2 \ldots n_5$ the mean refractive indices of the glasses used, and $V_1, V_2 \ldots V_5$ their Abbé V numbers.

In the example shown in Figure 1, the equivalent focal length is 1.00, the relative aperture F/2.

Table A

| Element | Radius | Thickness or Separation | Refractive Index | Abbé V Number |
|---|---|---|---|---|
| e | $r_1+ .5521$ | $d_1\ .0953$ | $n_1\ 1.613$ | $V_1\ 59.9$ |
|   | $r_2+1.9300$ | $d_2\ 0$ |  |  |
| a | $r_3+ .2842$ | $d_3\ .1189$ | $n_2\ 1.613$ | $V_2\ 59.9$ |
|   | $r_4+ .6920$ |  |  |  |
| b | $r_5+ .2168$ | $d_4\ .0150$ | $n_3\ 1.700$ | $V_3\ 30.3$ |
|   |   | $d_5\ .2208$ |  |  |
|   | $r_6- .2446$ |  |  |  |
| c | $r_7- .2971$ | $d_6\ .0903$ | $n_4\ 1.613$ | $V_4\ 59.9$ |
|   |   | $d_7\ 0$ |  |  |
|   | $r_8+1.2765$ |  |  |  |
| f | $r_9-1.6240$ | $d_8\ .0502$ | $n_5\ 1.613$ | $V_5\ 59.9$ |

$(b) = 0.2208$ in the sense in which it is used above, and $(s) = d_3+d_4+d_5+d_6 = 0.4450$, so that the ratio $b/s = 0.496$.

In the example illustrated in Figure 2, the equivalent focal length is 1.00, the relative aperture F/2.

Table B

| Element | Radius | Thickness or Separation | Refractive Index | Abbé V Number |
|---|---|---|---|---|
| e | $r_1+ .5373$ | $d_1\ .1166$ | $n_1\ 1.691$ | $V_1\ 54.8$ |
|   | $r_2+ 1.547$ | $d_2\ 0$ |  |  |
| a | $r_3+ .2505$ | $d_3\ .1049$ | $n_2\ 1.613$ | $V_2\ 57.6$ |
|   | $r_4+ .5793$ |  |  |  |
| b | $r_5+ .1964$ | $d_4\ .0152$ | $n_3\ 1.700$ | $V_3\ 30.3$ |
|   |   | $d_5\ .2788$ |  |  |
|   | $r_6- .2153$ |  |  |  |
| c | $r_7- .3187$ | $d_6\ .0912$ | $n_4\ 1.613$ | $V_4\ 36.9$ |
|   |   | $d_7\ 0$ |  |  |
|   | $r_8+2.990$ |  |  |  |
| f | $r_9- .5782$ | $d_8\ .1420$ | $n_5\ 1.621$ | $V_5\ 60.3$ |

Incidentally, it will be seen that, in this second example, the front convergent lens $e$ is made of one of the recent high refractive index glasses already mentioned. Also, it will be noted that in this case, $(b)$ is 0.2788, and $$(s) = d_3+d_4+d_5+d_6 = 0.4901$$

so that the ratio $b/s = 0.569$.

I claim:

1. An optical lens having a relative aperture not less than F/2.5 and comprising an aperture stop, two meniscus components disposed adjacent to, concave to and one on each side of said aperture stop, and each formed with the concave surface of greater curvature than the convex surface of same, the meniscus component located on the front side of said aperture stop being formed as a cemented doublet and the meniscus component on the rear side of said stop being a single-element lens, and front and rear convergent systems each on the side of one of said menisci remote from said aperture stops, said lens elements being spaced with the ratio of the axial separation between the concave surfaces of said menisci and the axial distance from the rear surface of said front convergent system to the front surface of said rear convergent system not substantially less than 0.45 and not substantially greater than 0.57, and said cemented doublet comprising a divergent element having Abbé V number less than 37.0 and a convergent element having Abbé V number greater than 54.0.

2. An optical objective comprising an aperture stop, a front meniscus component formed of a cemented doublet comprising a divergent element having an Abbé V number of the order of 30 and convergent element having an Abbé V number of the order of 60, said divergent element being adjacent said stop and concave thereto, a single-element meniscus component located on the rear side of said aperture stop and being concave thereto, each of said menisci having an axial length greater than 0.04 but not greater than 0.16 of the equivalent focal length of the objective, a convergent component arranged in front of said front meniscus, a convergent component arranged in the rear of said rear meniscus, said components being spaced with a ratio of the axial separation between the concave surfaces of said menisci and the axial distance from the rear surface of said front convergent component to the front surface of said rear convergent component of not substantially less than 0.45 and not substantially greater than 0.57.

3. An optical objective according to claim 2 wherein said front and rear convergent components are formed of single-element lenses and are substantially in contact with the convex surfaces of the front and rear meniscus components respectively.

4. An optical objective comprising four axially aligned components including two meniscus components arranged on opposite sides of an aperture stop, each being concave to said stop and one being a cemented doublet, and a pair of convergent components arranged on the opposite sides of said meniscus components from said aperture stop, said components having numerical data substantially as set forth in the following table:

[Equivalent focal length+1.000]

| Element | Radius | Thickness or Separation | Refractive Index | Abbé V Number |
|---|---|---|---|---|
| e | $r_1=+ .5521$ | $d_1=.0953$ | $n_1=1.613$ | $V_1=59.9$ |
|   | $r_2=+1.9300$ | $d_2=0$ |  |  |
| a | $r_3=+ .2842$ | $d_3=.1189$ | $n_2=1.613$ | $V_2=59.9$ |
|   | $r_4=+ .6920$ |  |  |  |
| b | $r_5=+ .2168$ | $d_4=.0150$ | $n_3=1.700$ | $V_3=30.3$ |
|   |   | $d_5=.2208$ |  |  |
|   | $r_6=- .2446$ |  |  |  |
| c | $r_7=- .2971$ | $d_6=.0903$ | $n_4=1.613$ | $V_4=59.9$ |
|   |   | $d_7=0$ |  |  |
|   | $r_8=+1.2765$ |  |  |  |
| f | $r_9=-1.6240$ | $d_8=.0502$ | $n_5=1.613$ | $V_5=59.9$ | wherein $r_1, r_2 \ldots$ indicate the radii of the individual surfaces counting from the front, $d_1, d_3, d_4, d_6, d_8$ indicate the axial thicknesses of the individual elements and $d_2, d_5, d_7$ indicate the axial air separations between the components.

5. An optical objective comprising four axially aligned components including two meniscus components arranged on opposite sides of an aperture stop, each being concave to said stop and one being a cemented doublet, and a pair of convergent components arranged on the opposite sides of said meniscus components from said aperture stop, said components having numerical data substantially as set forth in the following table:

[Equivalent focal length=1.000]

| Element | Radius | Thickness or Separation | Refractive Index | Abbé V Number |
|---|---|---|---|---|
| e | $r_1=+.5373$ | $d_1=.1166$ | $n_1=1.691$ | $V_1=54.8$ |
|  | $r_2=+1.547$ | $d_2=0$ |  |  |
| a | $r_3=+.2505$ | $d_3=.1049$ | $n_2=1.613$ | $V_2=57.6$ |
|  | $r_4=+.5793$ |  |  |  |
| b | $r_5=+.1964$ | $d_4=.0152$ | $n_3=1.700$ | $V_3=30.3$ |
|  |  | $d_5=.2788$ |  |  |
| c | $r_6=-.2153$ | $d_6=.0912$ | $n_4=1.613$ | $V_4=36.9$ |
|  | $r_7=-.3187$ | $d_7=0$ |  |  |
| f | $r_8=+2.990$ | $d_8=.1420$ | $n_5=1.621$ | $V_5=60.3$ |
|  | $r_9=-.5782$ |  |  |  | wherein $r_1, r_2 \ldots$ indicate the radii of the individual surfaces counting from the front, $d_1, d_3, d_4, d_6, d_8$ indicate the axial thicknesses of the individual elements and $d_2, d_5, d_7$ indicate the axial air separations between the components.

CHARLES GORRIE WYNNE.

REFERENCES CITED

The following references are of record in the file of this patent:

UNITED STATES PATENTS

| Number | Name | Date |
|---|---|---|
| 583,336 | Rudolph | May 25, 1897 |
| 1,786,916 | Merte | Dec. 30, 1930 |
| 2,031,792 | Richter | Feb. 25, 1936 |
| 2,100,290 | Lee | Nov. 23, 1937 |
| 2,171,640 | Berek | Sept. 5, 1939 |
| 2,319,171 | Warmisham et al. | May 11, 1943 |

FOREIGN PATENTS

| Number | Country | Date |
|---|---|---|
| 157,040 | Great Britain | Jan. 20, 1921 |
| 487,453 | Great Britain | June 21, 1938 |